US012305405B1

(12) United States Patent
Royer et al.

(10) Patent No.: US 12,305,405 B1
(45) Date of Patent: May 20, 2025

(54) REMOUNTABLE MAGNETIC PANEL SYSTEM

(71) Applicant: WINDFALL LUMBER, INC., Tumwater, WA (US)

(72) Inventors: Scott Royer, Tumwater, WA (US); Eric Nichols, Tumwater, WA (US); Scott Richard Lavis-Campbell, Tumwater, WA (US)

(73) Assignee: WINDFALL LUMBER, INC., Tumwater, WA (US)

( * ) Notice: Subject to any disclaimer, the term of this patent is extended or adjusted under 35 U.S.C. 154(b) by 663 days.

(21) Appl. No.: 16/908,474

(22) Filed: Jun. 22, 2020

Related U.S. Application Data

(60) Provisional application No. 62/865,271, filed on Jun. 23, 2019.

(51) Int. Cl.
*A47B 97/00* (2006.01)
*A47B 63/00* (2006.01)
(Continued)

(52) U.S. Cl.
CPC .......... *E04F 13/0819* (2013.01); *A47B 63/00* (2013.01); *A47B 95/008* (2013.01);
(Continued)

(58) Field of Classification Search
CPC .............. E04F 13/0819; E04F 13/0883; E04F 13/0882; E04F 15/02144; E04F 13/088;
(Continued)

(56) References Cited

U.S. PATENT DOCUMENTS 1,931,713 A 10/1933 Walper
2,071,865 A 2/1937 Parsons
(Continued)

FOREIGN PATENT DOCUMENTS

CN 113969652 A * 1/2022
DE 102013109721 A1 * 3/2015 .......... E04F 13/0866
(Continued)

OTHER PUBLICATIONS

Korean Patent 101632323 B1 and English Translation (Year: 2016).*
WO 2005/049935 A2 and machine translation (Year: 2005).*

*Primary Examiner* — Ryan D Kwiecinski
(74) *Attorney, Agent, or Firm* — R. Reams Goodloe, Jr.

(57) ABSTRACT

A wall panel system. In an embodiment, the wall panel system includes a plurality of wall panels magnetically and removably mounted to magnetically attractive mounting brackets affixed to a wall. In an embodiment, the mounting brackets are steel strips mounted at selected heights above the bottom of the wall. The wall panels may include various design components, including wood, wood veneer, textiles, metal, dry erase board, chalkboards, tempered glass, artistic paintings and designs, as well as functional components such as lighting panels or bookcases. A plurality of permanent magnets is affixed to a backing plate, preferably in a recessed configuration with respect to a reverse surface of the backing plate. The magnets releasably secure the wall panels to the mounting strips. Wall panels may be provided in various shapes and sizes, such as squares or rectangles of selected dimensions.

39 Claims, 12 Drawing Sheets

(51) Int. Cl.

| | |
|---|---|
| ***A47B 95/00*** | (2006.01) |
| ***E04F 13/08*** | (2006.01) |
| ***E04F 13/10*** | (2006.01) |
| ***E04F 13/12*** | (2006.01) |
| ***E04F 13/14*** | (2006.01) |
| ***E04F 13/16*** | (2006.01) |
| ***F21S 8/00*** | (2006.01) |
| ***F21V 21/096*** | (2006.01) |
| ***H01F 7/02*** | (2006.01) |
| *F21Y 105/00* | (2016.01) |

(52) U.S. Cl.

CPC ........ *A47B 97/001* (2013.01); *E04F 13/0866* (2013.01); *E04F 13/0871* (2013.01); *E04F 13/10* (2013.01); *E04F 13/12* (2013.01); *E04F 13/145* (2013.01); *E04F 13/16* (2013.01); *F21S 8/033* (2013.01); *F21V 21/096* (2013.01); *H01F 7/02* (2013.01); *F21Y 2105/00* (2013.01)

(58) Field of Classification Search

CPC . E04F 13/0803; E04F 13/081; E04F 13/0816; E04F 13/0866; E04F 13/0871; E04F 13/10; E04F 13/12; E04F 13/16; E04F 13/145; A47B 97/001

See application file for complete search history.

(56) References Cited

U.S. PATENT DOCUMENTS

| | | | | | |
|---|---|---|---|---|---|
| 3,292,328 | A * | 12/1966 | Darling | E05C 19/16 52/471 |
| 3,522,923 | A | 8/1970 | Charpentier | |
| 3,609,934 | A * | 10/1971 | O'Carroll | E04F 13/0883 52/461 |
| 4,287,676 | A * | 9/1981 | Weinhaus | G09F 7/18 40/661.01 |
| 4,635,410 | A * | 1/1987 | Chumbley | E04F 13/0883 52/273 |
| 4,744,189 | A * | 5/1988 | Wilson | B44C 7/022 434/421 |
| 4,934,119 | A * | 6/1990 | Ybarra | E04F 13/0883 52/764 |
| 5,172,503 | A * | 12/1992 | Dane | A47G 1/168 206/455 |
| 7,971,404 | B2 | 7/2011 | Timko et al. | |
| 8,314,672 | B2 | 11/2012 | Fullerton et al. | |
| 9,140,017 | B1 * | 9/2015 | Oliver | E04F 13/081 |
| 9,926,708 | B1 * | 3/2018 | Janko | E04F 13/0883 |
| 10,081,941 | B2 | 9/2018 | Timko et al. | |
| 10,189,236 | B2 * | 1/2019 | Lautzenhiser | E04F 13/0883 |
| 10,329,773 | B1 * | 6/2019 | Ferguson | E04F 13/083 |
| 10,457,031 | B2 | 10/2019 | Lautzenhiser et al. | |
| 10,927,551 | B2 * | 2/2021 | Klein | E04F 15/02044 |
| 2009/0211621 | A1 | 8/2009 | LeBlanc | |
| 2016/0319553 | A1 | 11/2016 | Lautzenhiser et al. | |
| 2017/0350147 | A1 * | 12/2017 | Janko | E04F 13/072 |
| 2018/0073252 | A1 * | 3/2018 | Janko | A47G 3/00 |
| 2021/0363758 | A1 * | 11/2021 | Creech | E04F 13/0833 |

FOREIGN PATENT DOCUMENTS

| | | | | |
|---|---|---|---|---|
| DE | 102013109897 | A1 * | 3/2015 | E04C 2/521 |
| EP | 1614827 | A1 * | 1/2006 | A47B 96/20 |
| FR | 2033518 | A5 * | 12/1970 | E04F 13/0883 |
| GB | 1089605 | A | 11/1967 | |
| GB | 2324067 | A * | 10/1998 | B44C 3/12 |
| GB | 2418933 | A * | 4/2006 | E04F 13/088 |
| KR | 101632323 | B1 * | 6/2016 | |
| KR | 102113777 | B1 * | 5/2020 | |
| WO | WO-2005049935 | A2 * | 6/2005 | E04F 13/00 |
| WO | WO-2015114569 | A1 * | 8/2015 | E04F 15/02144 |
| WO | WO-2017197503 | A1 * | 11/2017 | E04F 13/0883 |
| WO | WO-2018012077 | A1 * | 1/2018 | |
| WO | WO-2019040984 | A1 * | 3/2019 | |

* cited by examiner

© 2020 Windfall Lumber, Inc.

REMOUNTABLE MAGNETIC PANEL SYSTEM

RELATED PATENT APPLICATIONS

This application claims priority from prior U.S. Provisional Patent Application Ser. No. 62/865,271 filed Jun. 23, 2019, entitled REMOUNTABLE MAGNETIC PANEL SYSTEM, the disclosure of which is incorporated herein in its entirety, including the specification, drawing, and claims, by this reference.

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to architectural wall panels, used to enhance appearance of surfaces such as walls in building construction and renovation.

BACKGROUND

A continuing need exists for improvements in wall panel systems. More specifically, a need exists for improved structures and methods for initially mounting or later changing of interior wall panels.

A common problem encountered in prior art interior wall panel systems is that such panels are usually fixedly mounted to a wall, so that while they provide a secure wall panel system, the panels are, for all practical purposes, permanently mounted. Consequently, it is time consuming to change the appearance of a wall, since the permanently mounted wall panels in a panel system must be removed, and a new wall panel panels, or a completely new wall panel system including mounting hardware, must be installed. And, besides the cost of the labor involved, disposal costs result, since old materials are removed and must be disposed of, as well as packaging and installation debris from the new wall panels installed.

And, installation and use of traditional tongue and groove wall cladding systems presents various problems in the field. First, most tongue and groove cladding installation requires a trained carpenter, with trim carpentry skills, to level each course of the installation as the installation progresses across or up a wall. And such installation often requires the use of nail guns and/or adhesives. Also, estimating job costs using traditional tongue and groove wall cladding is problematic, in that the estimated costs by a millwork installation company is subject to many variables, such as the current demand on their time, current market conditions, personnel involved, and the like, all of which contribute to highly variable installation costs for a traditional tongue and groove system.

Thus, there remains a continuing and unmet need for an architectural wall panel system which includes wall panels that are easily and safely detachably mounted to a wall, and which enables the replacement of existing wall panels without the necessity to remove mounting brackets or other attachment hardware and anchors as used in existing prior art devices.

Some Objects, Advantages, and Novel Features

An objective of our invention is to provide a design for a wall panel system in which wall panels may be detachably mounted to a selected surface such as an interior wall.

Another objective of our invention is to provide a design for a wall panel system in which the wall panels may be quickly initially mounted to provide a plurality of wall panels having a selected visual appearance.

Another objective of our invention is to provide a design for a wall panel system in which the wall panels may be quickly replaced with other wall panels having a different visual appearance.

Another important objective is to provide a wall panel system in which the selected wall panel size is easily and rapidly adjustable, yet enables the user to cover a wall area selected for wall panel coverage.

Another important objective is to provide wall panel system in which wall panels are provided in a plurality of sizes, to allow for adjustment of the appearance, or for contrasting wall panel appearance, on a selected wall.

Another objective is to provide a wall panel system which does not require a trained carpenter for installation.

A related and important objective is to provide a wall panel system in which the wall panels are sturdy and in which the panels are securely but detachably affixed to a wall.

Another important objective is to provide a selection of wall panel sizes and of various visual appearance, so that wall panels of various appearance, size, and shape may be easily installed on existing or new walls.

Finally, another important objective is to provide a high quality, visually pleasing wall panel system which can be conveniently and easily manufactured with conventional manufacturing processes, so that manufacturing costs are minimized.

SUMMARY

We have now invented a wall panel system which provides for easy installation of visually appealing panels without the need for specialized labor or equipment. In an embodiment, the wall panels may be provided with attractive wood panel surfaces. The wall panel system includes the use of mounting brackets affixed to a wall that is to be covered with wall panels. The mounting brackets may be thin steel strips affixed to a wall (by screws or other fasteners) at prescribed spaced apart distances above the floor. In any event, the mounting brackets are a magnetically attracted body adapted for being secured to a wall in a manner that will support the weight of the wall panels to be installed. As installed, the mounting brackets have an attachment surface facing outward from the wall, and to which high strength magnets in wall panels may be securely mounted.

A plurality of architectural wall panels are provided. The wall panels are each magnetically and releasably securable to the mounting brackets, which in an embodiment may be elongated steel strips. In an embodiment, some or all of the wall panels may be provided in the general shape of a parallelepiped, which is a three dimensional solid having six faces. In an embodiment, a wall panel may include a front panel affixed to the obverse side of a backing plate, a rear cover sheet affixed to the reverse side of a backing plate, and a plurality of strong magnets with sufficient magnetic strength to securely yet releasably hold the wall panel to one or more mounting brackets. In various embodiments the rear cover sheet may be affixed by adhesive to the reverse side of the backing plate. In various embodiments, a plurality of permanent magnets may be recessed into the rear cover sheet, or may be attached through holes in the rear cover sheet and secured to the reverse side of the backing plate. The front panel may be provided in a wide variety of configurations. In various embodiments, the front panel may include (but is not limited to) one or more of the following:

- wood slats
- wood panels
- solid wood
- metal
- tempered glass
- textured glass
- painted surfaces, whether wood, metal, or other material
- graphic designs
- chalk board
- dry erase board
- lighting box for illumination
- bookshelves In an embodiment, grooved wood veneer may be provided in a single piece for attachment to a backing plate. In an embodiment, a plurality of architectural staves may be affixed to a backing plate. In various embodiments, front panels including wood or wood like products may display wood grain in an architecturally aesthetically acceptable configuration.

In any event, the wall panels are securely yet releasably mounted to the mounting strips. Thus, wall panels provided according the disclosures herein now enables designers to specify easily configured (and reconfigurable) wall covering using a Cambio™ brand wall system panel from a group of selected patterns of prefabricated architectural finishes.

BRIEF DESCRIPTION OF THE DRAWING

The present invention(s) will be described by way of exemplary embodiments, using for illustration the accompanying drawing in which like reference numerals in the various figures denote like elements, and in which:

FIG. 5A is a top view of an embodiment for a wall panel having a plurality of wood portions affixed to the obverse side of a backing plate, and a rear cover sheet affixed to the reverse side of the backing plate.

FIG. 5B is a top view of an embodiment for a wall panel, showing six architectural staves affixed to a backing plate, wherein a pair of permanent magnets are shown recessed into the backing plate, and wherein the backing plate is shown as if manufactured from a hard fiber board such as Masonite brand fiberboard.

FIG. 5C is a top view of an embodiment for a wall panel, showing a one-piece wood veneer with grooves therein affixed to a backing plate, wherein a pair of permanent magnets are shown penetrating through the rear cover sheet, for flush mounting to the reverse side of the backing plate, and wherein the backing plate is shown as if manufactured from particle board.

FIG. 5D is a top view illustrative of various embodiments of a wall panel, showing a front panel (such as a dry erase board, or chalk board, or tempered glass, or patterned glass, or painted material such as wood, or, not shown but the same except for thickness of the front piece, a thinner front piece of sheet metal) affixed to a backing plate, wherein a pair of permanent magnets are shown penetrating through the rear cover sheet, for flush mounting to the reverse side of the backing plate, and wherein the backing plate may be provided in plywood, particle board, hard fiber board, or equivalent.

FIG. 5E is a top view illustrative of various embodiments of a wall panel, showing a front piece provided in a textile material (such felt, carpeting, or other sound attenuating material) affixed to a backing plate, wherein a pair of permanent magnets are shown penetrating through the rear cover sheet, for flush mounting to the reverse side of the backing plate, and wherein the backing plate may be provided in plywood, particle board, medium density fiber board ("MDF"), or hard fiber board, or equivalent.

FIG. 6A shows a back elevation view of a wall panel in a square configuration, for example as if provided in an eighteen inch by eighteen inch (18"×18") square, and using two pairs of magnets spaced for secure magnetic engagement with two mounting brackets, one above the other on a wall.

FIG. 6B shows a back elevation view of a wall panel in a rectangular configuration, for example as if provided in an eighteen inch wide by thirty six inch tall (18"×36") configuration, and using four pairs of magnets spaced apart for secure magnetic engagement with four mounting brackets, spaced apart vertically on a wall.

FIG. 6C shows a back elevation view of a wall panel in a rectangular configuration, for example as if provided in an eighteen inch wide by fifty four inch tall (18"×54") configuration, and using six pairs of magnets spaced apart for secure magnetic engagement with six mounting brackets, spaced apart vertically on a wall.

FIG. 6D shows a back elevation view of a wall panel in a square configuration, for example as if provided in an thirty six inch wide by thirty six inch tall (36"×36") square configuration, and using four quadruple groupings of magnets (eight pairs, with two pairs side-by-side at each level) spaced apart for secure magnetic engagement with four mounting brackets, spaced apart vertically on a wall.

FIG. 11A is vertical elevation view of a wall panel having four sub-panels, with the wall panel having an overall outside dimension of width W of thirty six inches (36"), and a height T of thirty six (36") inches.

FIG. 11 B is vertical elevation view of a wall panel having the appearance of using six architectural staves, with the wall panel having an overall outside dimension of width W of eighteen inches (18") and height T of eighteen inches (18").

FIG. 11C is vertical elevation view of a wall panel having two sub-panels, with the wall panel having an overall outside dimension of width W of eighteen inches (18") and height T of thirty six inches (36").

FIG. 11D is vertical elevation view of a wall panel having three sub-panels, with the wall panel having an overall outside dimension of width W of eighteen inches (18") and height T of fifty four (54") inches.

FIG. 13 provides a perspective view of an embodiment for mounting a pair of permanent magnets in a magnet casing, showing the use of a base metal casing, a plastic frame casing inserted in the base metal casing, a pair of magnets inserted into slots in the plastic frame casing, and a metal spacer bar between the two magnets, and using magnets of a length that utilizes the entire space available within a plastic frame casing (e.g. magnets of an inch (1") in length).

FIG. 14 provides a cross-sectional view of the embodiment for mounting a pair of permanent magnets in a magnet casing, taken as if across line 14-14 of FIG. 13, showing the use of a base metal casing, a plastic frame casing inserted in the base metal casing, a pair of magnets inserted into slots in the plastic frame casing, and a metal spacer bar between the two (2) magnets.

FIG. 15 provides an exploded perspective view of the embodiment for mounting a pair of permanent magnets in a magnet casing as just illustrated in FIGS. 12 and 13 above, showing the use of a base metal casing, a plastic frame casing inserted in the base metal casing, a pair of magnets inserted into slots in the plastic frame casing, and a metal spacer bar between the two magnets.

FIG. 16 provides a plan view of an embodiment for mounting a pair of permanent magnets in a magnet casing, similar to the embodiment just illustrated in FIGS. 13-15 above, but now showing use of shorter length magnets (e.g. three quarter of an inch (¾") in length), and additionally showing the use of spacers at both ends of the magnets, but still showing the use of a base metal casing, a plastic frame casing inserted in the base metal casing, a pair of magnets inserted into slots in the plastic frame casing, and a metal spacer bar between the two (2) magnets.

FIG. 17 provides a plan view of an embodiment for mounting a pair of permanent magnets in a magnet casing, similar to the embodiment just illustrated in FIG. 16 above, but now showing use of yet shorter length magnets (e.g. five-eighths of an inch (⅝") in length), and also showing the use of spacers at either of the magnets, but still showing the use of a base metal casing, a plastic frame casing inserted in the base metal casing, a pair of magnets inserted into slots in the plastic frame casing, and a metal spacer bar between the two (2) magnets.

FIG. 18 provides a plan view of an embodiment for mounting a pair of permanent magnets in a magnet casing, similar to the embodiment just illustrated in FIGS. 16 and 17 above, but now showing use of yet shorter length magnets (e.g. one-half of an inch (½") in length), and also showing the use of spacers at either the of the magnets, but still showing the use of a base metal casing, a plastic frame casing inserted in the base metal casing, a pair of magnets inserted into slots in the plastic frame casing, and a metal spacer bar between the two magnets.

Figure 1:
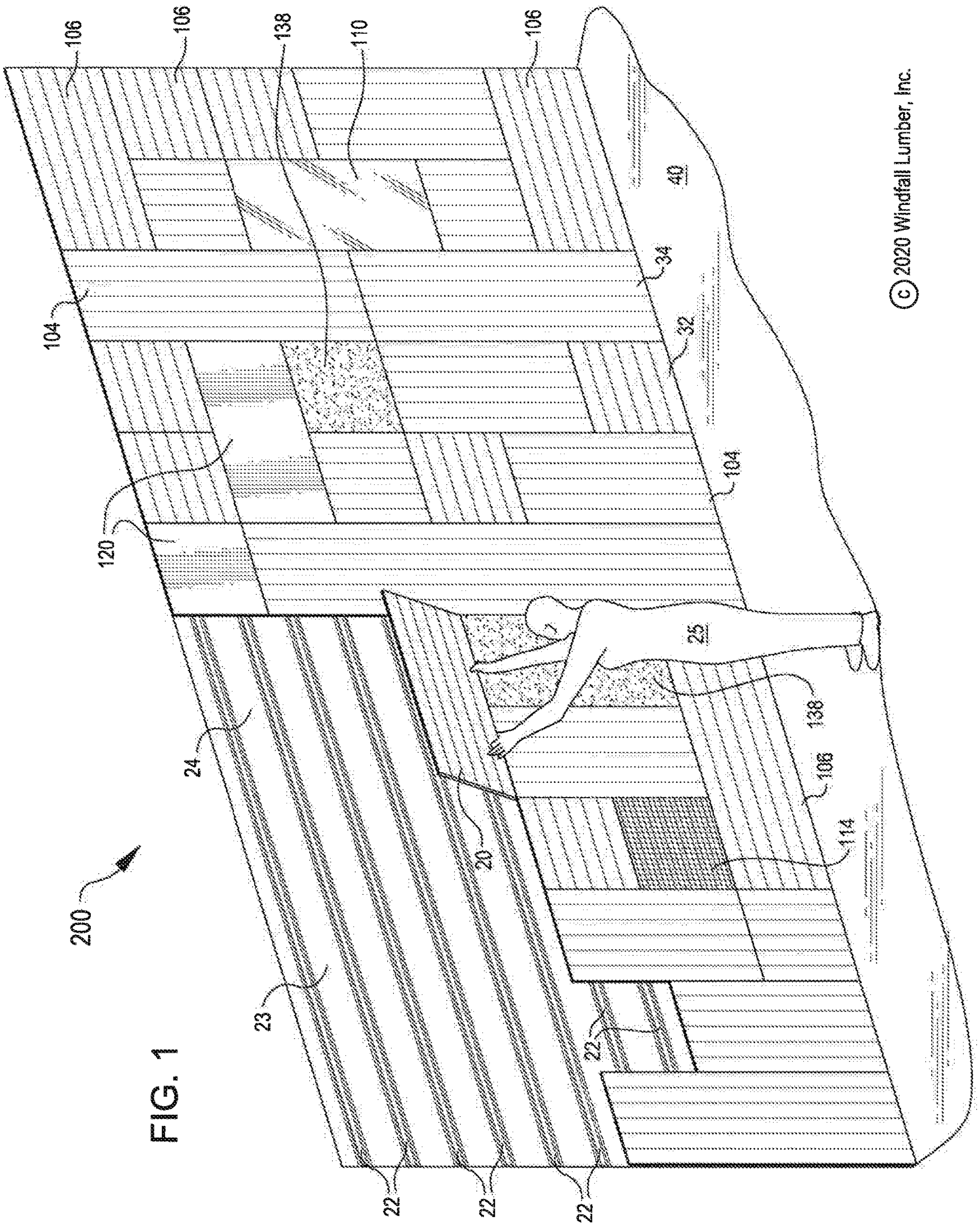
FIG. 1 is a perspective view of an embodiment of a wall panel system, showing a wall panel in the wall panel system being removably affixed by a user to mounting brackets in the form of wall mounted steel strips.

The foregoing figures, being merely exemplary, contain various elements that may be present or omitted from a final configuration for an embodiment of a wall panel system that uses wall panels magnetically mounted to a plurality of mounting brackets. Mounting brackets may be in the form of steel plates, or may be implemented in other suitable ferromagnetic materials to provide a wall mounting system using the wall panels as described in various embodiments detailed or suggested herein. Other variations in wall panel systems may use other ferromagnetic or ferrimagnetic structures, other sizes and shapes of components such as steel strips or permanent magnets, and yet employ the principles described herein and as generally depicted in the drawing figures provided, and as more specifically called out in the claims set forth below. For example, cylindrical shaped and parallelepiped shaped magnets are illustrated, but other shapes may be utilized. And, while the use of single magnets and pairs of magnets are illustrated, other groupings of magnets may be useful in certain configurations, or may be useful from time to time due to costs of components. In particular, although various dimensions may be utilized by those of skill in the art to make and use the claimed invention, and there is no intention to limit the claimed invention to the use of parallelepiped wall panel shapes having rectangular shaped face portions, or to the dimensional data provided, all of which is exemplary rather than mandatory. Thus, a wall panel system with magnetically attachable and removable panels may be provided with wall panels in other shapes, and in which wall panels are sized up or down from any dimensions provided, or with parts provided in metric sizes, without affecting the scope of the appended claims. An attempt has been made to draw the figures in a way that illustrates at least those elements that are significant for an understanding of the exemplary wall panel system which may be used in various types of structures during renovation or new construction.

It should be understood that various features may be utilized in accord with the teachings hereof, as may be useful in different embodiments as useful for various sizes and shapes of wall panel systems for building construction, depending upon the specific requirements (such as height of the walls on which the wall panels are to be installed, or type of existing structures), within the scope and coverage of the teachings herein as defined by the claims. Further, like features in various embodiments for wall panel systems may be described using like reference numerals, or other like references, without further mention thereof.

DETAILED DESCRIPTION

Figure 7:
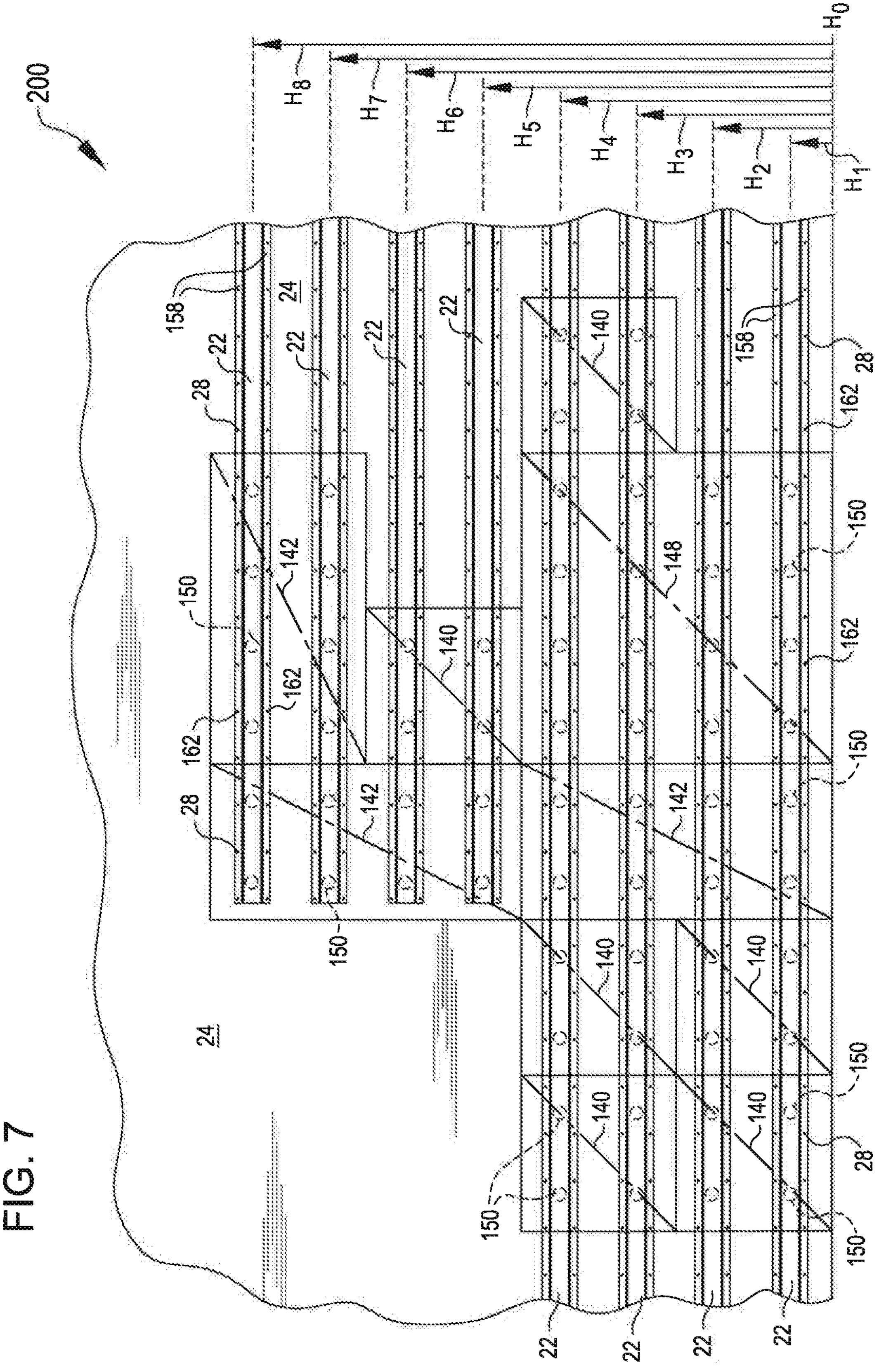
FIG. 7 is a perspective of an embodiment for installation of mounting brackets (e.g. steel strips) affixed at selected spaced heights $H_1$, $H_2$, $H_3$, above the bottom elevation $H_0$ of a wall, in a series of heights $H_1$, $H_2$, $H_a$ etc., to $H_N$, wherein N in a series of 1 to N is a positive integer, as well as illustrating planned locations (hidden line "O"s) for receiving permanent magnets (circular type shown, but similar locations for rectangular magnets) that are located on the wall panels.

Attention is directed to FIG. 1, where an exemplary wall panel 20 is shown being affixed to mounting brackets 22 (e.g. galvanized steel strips) to a workpiece wall 24 (see FIGS. 7,8, and 9) by worker 25. Mounting brackets 22 are seen in FIG. 7 to be affixed to wall 24 by fasteners 28 such as screws. In an embodiment, a wall panel 20 for architectural use may be fabricated as a single piece of material, roughly in a parallelepiped shape, i.e. a three dimensional solid with six (6) faces having straight edges and generally flat face surfaces (depending on how magnets (discussed below) are mounted, and on patterns or textures on the face panel 30 as further illustrated in FIGS. 5A-5E). As such, in various embodiments as seen in FIG. 1, a wall panel of interest may be provided as a square (e.g. wall panel 32), or as a rectangle (e.g. wall panel 34). Wall panels 20 may be functional as well as decorative, and may provide insulation or sound proofing, or other useful features as discussed below, in addition to providing a pleasing visual appearance. Using the novel wall panel system provided herein, wall panels 20 are both durable and easily replaceable. And, as taught herein, wall panels 20 may be provided in a variety of sizes, to increase installation efficiency, and to enhance the insulation or soundproofing qualities inherently provided.

Figure 2A:
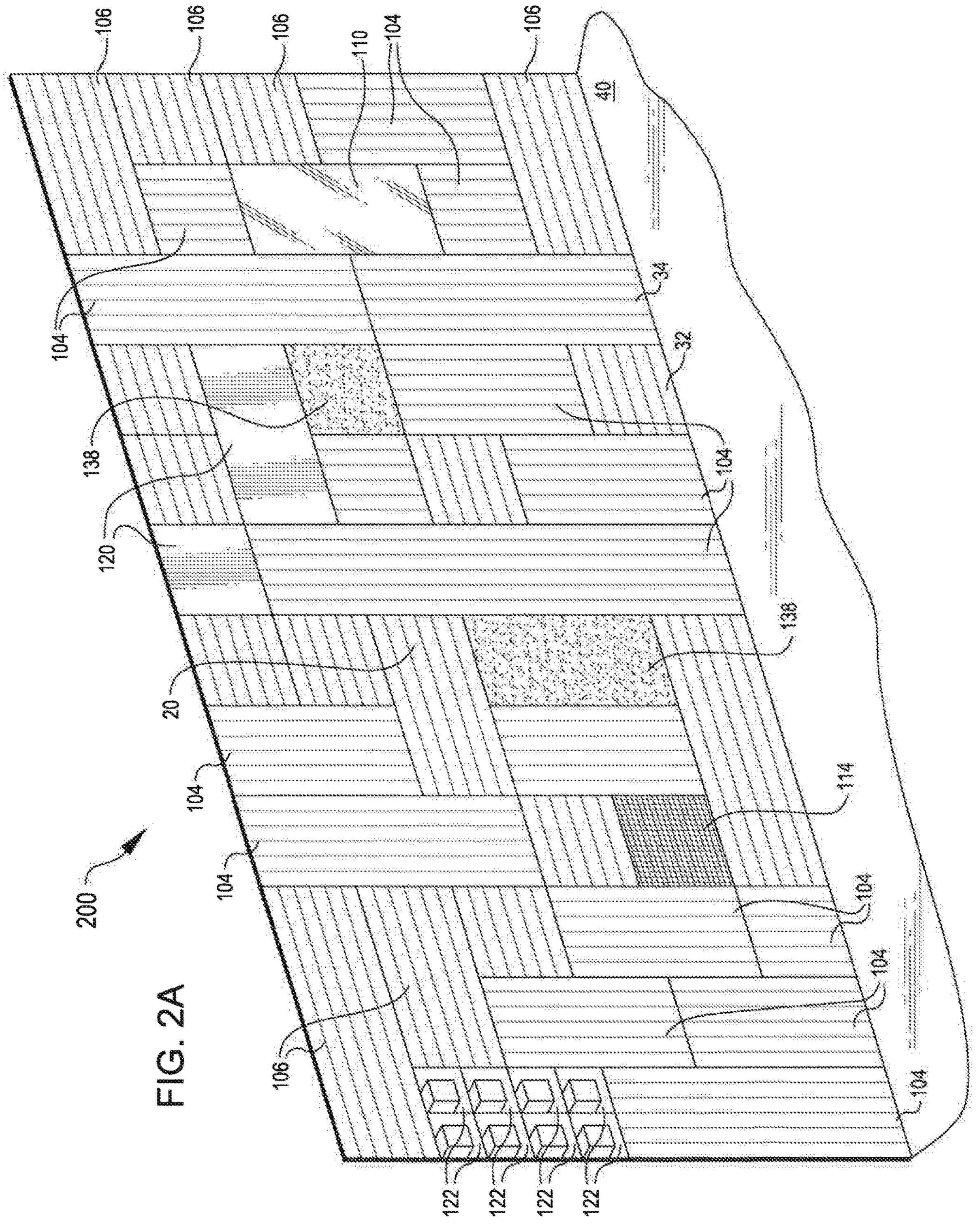
FIG. 2A is a perspective view of an embodiment for an installed wall panel system, showing the use of various materials for front panels of the wall panels, including architectural wood staves, erasable white boards, a textile (such as felt), and a tempered glass surface.
Figure 2B:
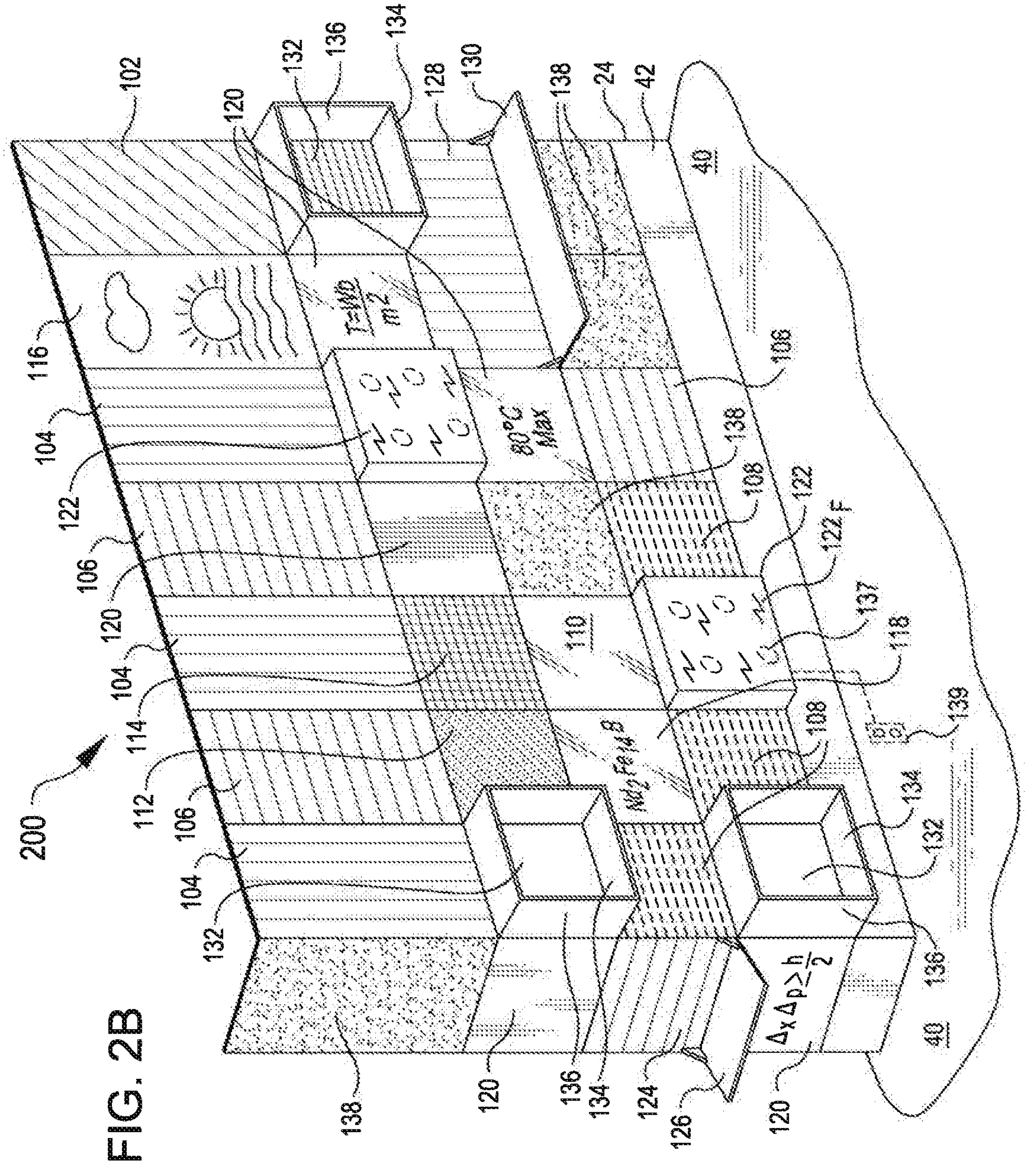
FIG. 2B is a perspective view of an embodiment for an installed wall panel system, showing the use of various materials for front portions of the wall panels, including grooved laminates, architectural wood staves, erasable white boards, chalk boards, textiles (such as felt), tempered glass surfaces, patterned glass surfaces, and painted surfaces, and graphic design surfaces, as well as the provision of bookshelves and lighting units.

In FIG. 2A, wall panels (e.g. wall panels 32 and 34) are shown removably affixed to mounting brackets 22 (see FIG. 1) as installed to cover a workpiece wall 24 (see FIGS. 1 and 7) using the wall panel system as taught herein. Wall panels (e.g. wall panels 20, 32, and 34) may cover an entire wall, down to floor 40, as seen in FIGS. 1 and 2A. Alternately, a base portion 42 of exposed wall 24 may be provided, as shown in FIG. 2B.

Attention is directed to FIGS. 5A, 5B, 5C, 5D, and 5E. These figures provide top views of various embodiments for wall panels having a front panel of various materials.

Figure 5A:
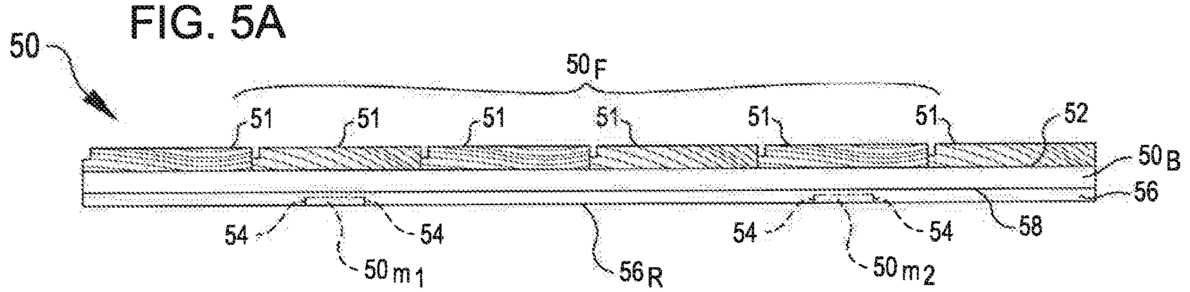
FIGS. 5A, 5B, 5C, 5D, and 5E are representative top views of various configurations for wall panels.

In FIG. 5A, a wall panel 50 has a front panel $\mathbf{50}_F$ that is provided using six architectural staves 51 affixed to the obverse side 52 of a backing plate $\mathbf{50}_B$. The backing plate $\mathbf{50}_B$ is shown as if provided in plywood. A pair of permanent magnets $\mathbf{50}_{M1}$ and $\mathbf{50}_{M2}$ are shown positioned in cutouts defined by edges 54 in a rear cover sheet 56 affixed to the reverse side 58 of backing plate $\mathbf{50}_B$. The rear cover sheet 56 may be affixed to the reverse side 58 of backing plate $\mathbf{50}_B$ using a suitable adhesive, such as a polyvinyl acetate (PVA) type glue. The rear cover sheet 56 has a rear surface $\mathbf{56}_R$.

Figure 5B:
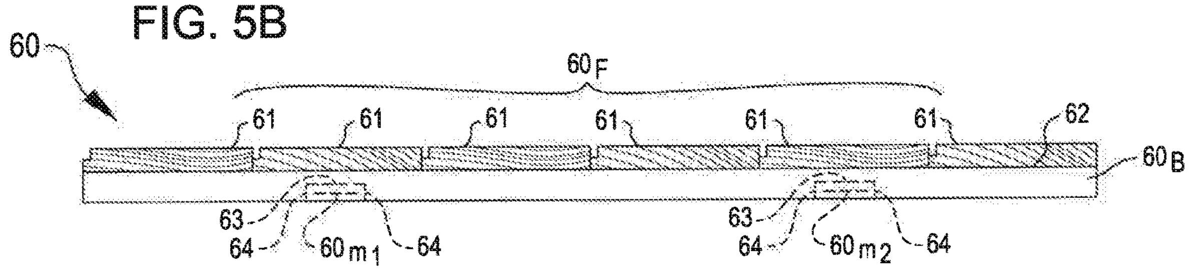

In FIG. 5B, a wall panel 60 has a front panel $\mathbf{60}_F$ that is provided using six architectural staves 61 affixed to the obverse side 62 of a backing plate $\mathbf{60}_B$. A pair of permanent magnets $\mathbf{60}_{M1}$ and $\mathbf{60}_{M2}$ are shown positioned in recesses 63 defined between cutouts 64 in the backing plate $\mathbf{60}_B$. The backing plate $\mathbf{60}_B$ is shown as if manufactured from a medium density fiber board ("MDF") or hard fiberboard such as Masonite brand fiberboard.

Figure 5C:
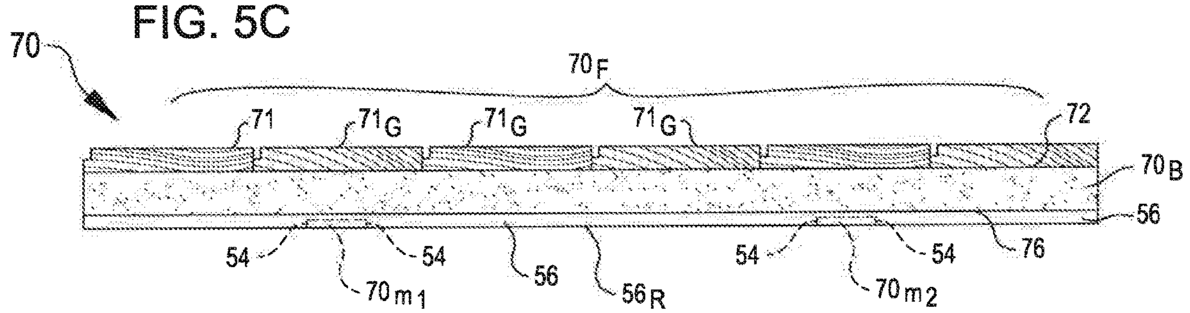

In FIG. 5C, a wall panel 70 has a front panel $\mathbf{70}_F$ that is providing using a one-piece wood veneer 71 with grooves $\mathbf{71}_G$ therein. The one-piece wood veneer 71 is affixed to the obverse side 72 of a backing plate $\mathbf{70}_B$. A pair of permanent magnets $\mathbf{70}_{M1}$ and $\mathbf{70}_{M2}$ are shown positioned in through-hole cutouts defined by edges 54 in a rear cover sheet 56 and affixed to the reverse side 76 of backing plate $\mathbf{70}_B$. The rear cover sheet 56 may be affixed to the reverse side 76 of backing plate $\mathbf{70}_B$ using a suitable adhesive, such as a polyvinyl acetate (PVA) type glue. In this embodiment, the backing plate $\mathbf{70}_B$ is shown as if manufactured from particle board. In an embodiment, the magnets $\mathbf{70}_{M1}$ and $\mathbf{70}_{M2}$ may be flush mounted with respect to a rear surface $\mathbf{56}_R$ of the rear cover sheet 56.

Figure 3:
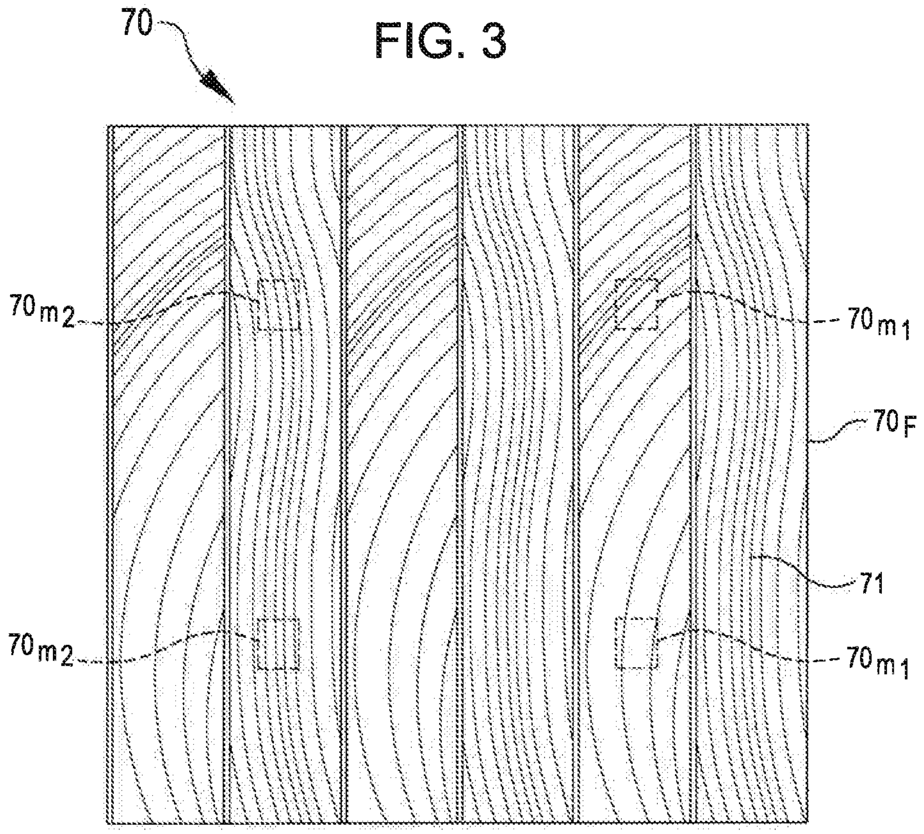
FIG. 3 is a front view of a wall panel, where the front panel provides the look of having six architectural wood staves, as well as showing in hidden lines the location of magnets used to affix the wall panel to the mounting brackets.
Figure 4:
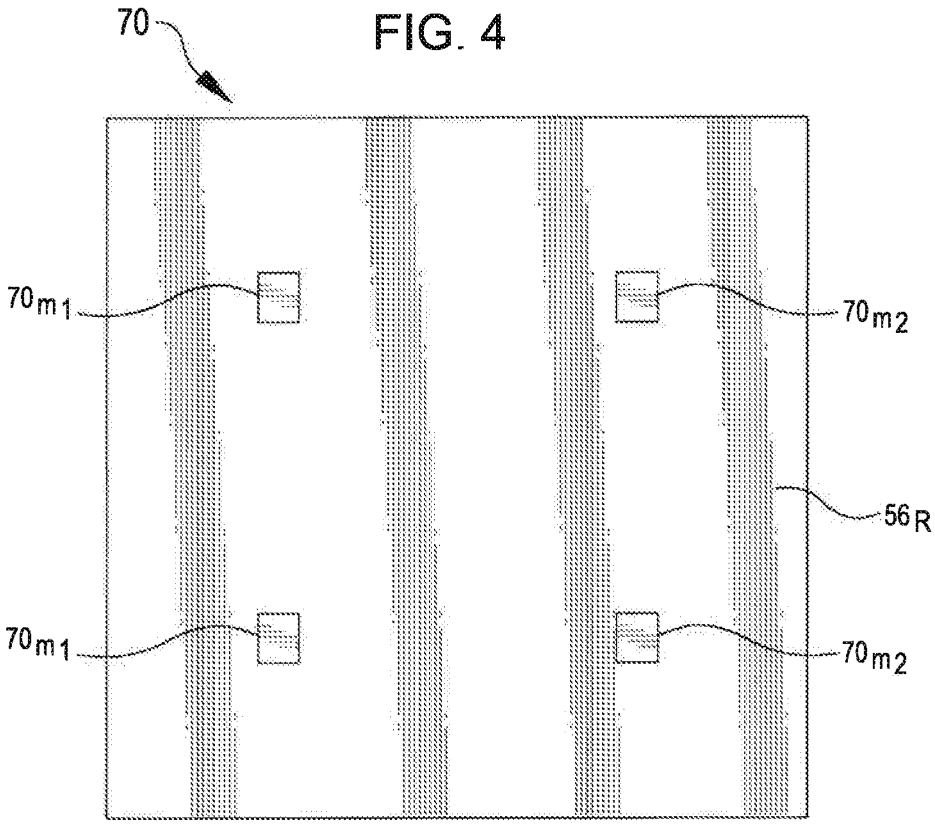
FIG. 4 is a back view of a wall panel, showing a rear cover sheet, and wherein permanent magnets are shown recessed into the rear cover sheet.

FIGS. 3 and 4 provide views of the front panel $\mathbf{70}_F$ and the rear surface $\mathbf{56}_R$ of the rear cover sheet 56 of a wall panel 70 as just illustrated in FIG. 5C. Although the wall panel 70 shown in FIGS. 3 and 4 are provided in a square configuration, for example as if sized in an eighteen inch (18") by eighteen inch (18") square configuration, other sizes may be similar in appearance.

Figure 5D:
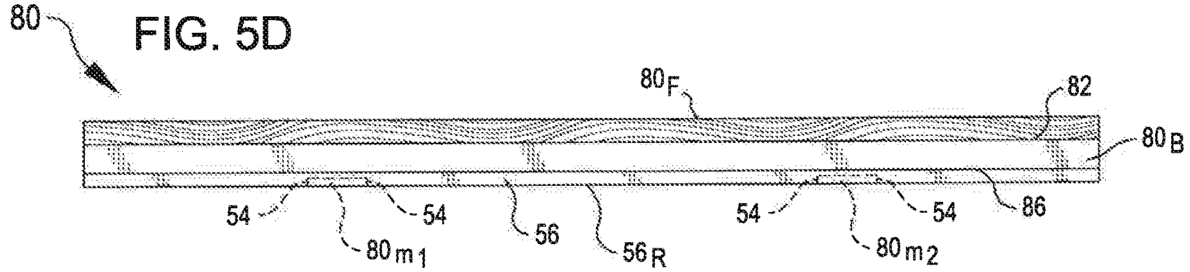

In FIG. 5D, a top view of a wall panel 80 is provided that is generally illustrative of various embodiments for a wall panel, showing a front panel $\mathbf{80}_F$ (such as a dry erase board, or chalk board, or tempered glass, or patterned glass, or painted material such as wood, or, not shown but the same except for thickness of the front panel $\mathbf{80}_F$, a thinner front piece of sheet metal) affixed to an obverse side 82 of a backing plate $\mathbf{80}_B$. A pair of permanent magnets $\mathbf{80}_{M1}$ and $\mathbf{80}_{M2}$ are shown positioned in through-hole cutouts defined by edges 54 in a rear cover sheet 56 and affixed to the reverse side 86 of backing plate $\mathbf{80}_B$. In various embodiments, a front panel $\mathbf{80}_F$ may be affixed to the obverse side 82 of backing plate $80_B$ using a suitable adhesive, such as a polyvinyl acetate (PVA) type glue. In this embodiment, the backing plate $80_B$ is shown as if manufactured from plywood. In an embodiment, the magnets $80_{M1}$ and $80_{M2}$ may be flush mounted with respect to a rear surface $56_R$ of the rear cover sheet 56.

Figure 5E:
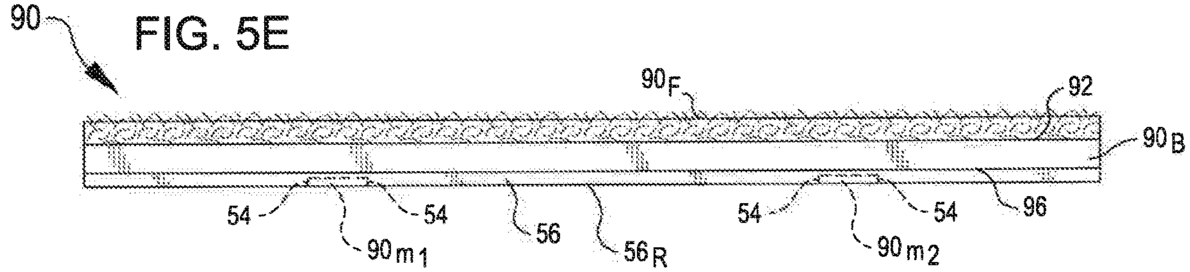

In FIG. 5E, a top view of a wall panel 90 is provided that is generally illustrative of various embodiments for a wall panel where textiles are utilized. The wall panel 90 has a front panel $90_F$ provided in a textile material, such as felt or carpeting. The front panel $90_F$ material is affixed to an obverse side 92 of a backing plate $90_B$. A pair of permanent magnets $90_{M1}$ and $90_{M2}$ are shown positioned in through-hole cutouts defined by edges 54 in a rear cover sheet 56 and affixed to the reverse side 96 of backing plate $90_B$. In various embodiments, a front panel $90_F$ may be affixed to the obverse side 92 of backing plate $90_B$ using a suitable adhesive, such as a polyvinyl acetate (PVA) type glue. In this embodiment, the backing plate $90_B$ is shown as if manufactured from plywood. In an embodiment, the magnets $90_{M1}$ and $90_{M2}$ may be flush mounted with respect to a rear surface $56_R$ of the rear cover sheet 56.

Attention is directed to FIG. 2B, where various types of front panels for wall panels are depicted. Options for front panels include, but are not limited to, the following designs:

- wood slats—in wall panel 102
- wood panels, vertical wood portions or grooves—in wall panels 104
- wood panels, horizontal portions or grooves—in wall panels 106
- metal—in wall panels 108, with markings noted as being silver in color
- tempered glass—in wall panel 110
- textured glass—in wall panel 112
- painted surfaces, whether wood, metal, or other material—wall panel 114
  (with markings noted as being yellow in color)
- graphic designs—in wall panel 116
- chalk board—in wall panel 118
- dry erase board—in wall panels 120
- lighting box for illumination—in wall panels 122
- bookshelves, short—in wall panel 124 (e.g., eighteen inch (18") length)
  with shelf 126
- bookshelves, long—in wall panel 128 (e.g., thirty six inch (36") length)
  with shelf 130
- bookshelves, with side panels—in wall panels 132
  with shelf 134 and side panels 136
- textile surface—in wall panels 138 (e.g., felt)

When lighting boxes for illumination are provided via wall panel 122, provisions must be made for supply of electrical power to the wall panel 122. Wall panels 122 provided as lighting boxes may be provided with light emitting diode (LED) lights 137, and a direct or indirect control for the LED lights must be provided, such as via control box 139. In such embodiment, a translucent outer surface panel $122_F$ may be provided.

Attention is directed to FIGS. 6A, 6B, 6C and 6D, each of which provide back elevation views for an embodiment of a wall panel. Wall panels may be provided in various sizes, and these illustrations are exemplary for suitable locations of permanent magnets at locations in the wall panels which are complementary in height or vertical spacing with respect to, and adapted for secure engagement with, mounting brackets affixed to a wall, as further explained in connection with FIG. 7 below.

Figure 6A:
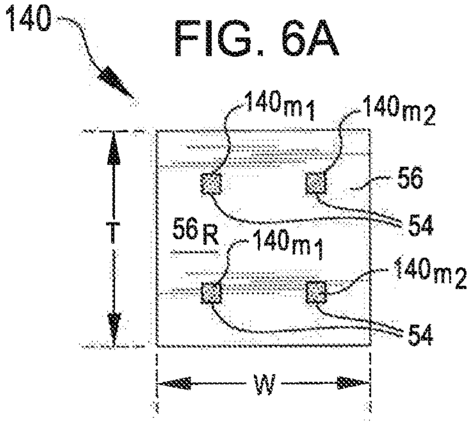
FIGS. 6A, 6B, 6C and 6D are back elevation views of various sizes of wall panels, showing the location of permanent magnets at locations in the wall panel complementary in height or vertical spacing with respect to, and adapted for secure engagement with, mounting brackets affixed to a wall.

FIG. 6A shows a back elevation view of a wall panel 140 in a square configuration, for example as if provided in an eighteen inch by eighteen inch (18"×18") square, and using two pairs of magnets $140_{M1}$ and $140_{M2}$, (or equivalent magnet packages as described below with respect to permanent magnet packages 210) spaced for secure magnetic engagement with two mounting brackets 22, one above the other on a wall (see FIG. 7). In an embodiment, the two pairs of magnets $140_{M1}$ and $140_{M2}$ may be provided at through-hole cutouts defined by edges 54 in a rear cover sheet 56, with the magnets being flush with the rear surface $56_R$ of the rear cover sheet 56.

Figure 6B:
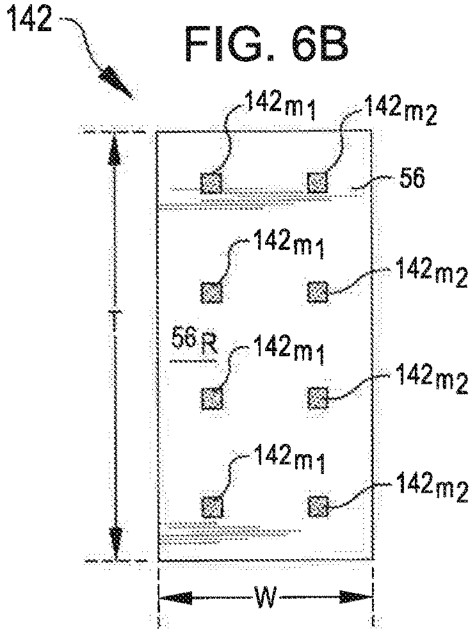

FIG. 6B shows a back elevation view of a wall panel 142 in a rectangular configuration, for example as if provided in an eighteen inch wide by thirty six inch tall (18"×36") configuration, and using four pairs of magnets $142_{M1}$ and $142_{M2}$ (or equivalent magnet packages as described below with respect to permanent magnet packages 210) spaced apart for secure magnetic engagement with four mounting brackets 22, spaced apart vertically on a wall, as can be seen in FIG. 7. In an embodiment, the four pairs of magnets $142_{M1}$ and $142_{M2}$ may be provided at through-hole cutouts defined by edges 54 in a rear cover sheet 56, with the magnets being flush with the rear surface $56_R$ of the rear cover sheet 56.

Figure 6C:
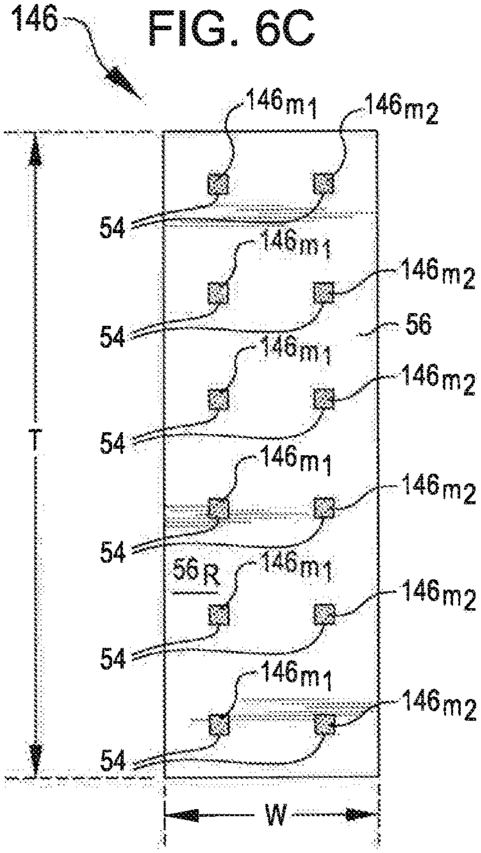

FIG. 6C shows a back elevation view of a wall panel 146 in a rectangular configuration, for example as if provided in an eighteen inch wide by fifty four inch tall (18"×54") configuration, and using six pairs of magnets $146_{M1}$ and $146_{M2}$ (or equivalent magnet packages as described below with respect to permanent magnet packages 210) spaced apart for secure magnetic engagement with six mounting brackets 22, spaced apart vertically on a wall, as can be seen in FIG. 7. In an embodiment, the four (4) pairs of magnets $146_{M1}$ and $146_{M2}$ (or equivalent pairs of magnet packages as described below with respect to permanent magnet packages 210) may be provided at through-hole cutouts defined by edges 54 in a rear cover sheet 56, with the magnets (or magnet packages 210) being flush with the rear surface $56_R$ of the rear cover sheet 56.

Figure 6D:
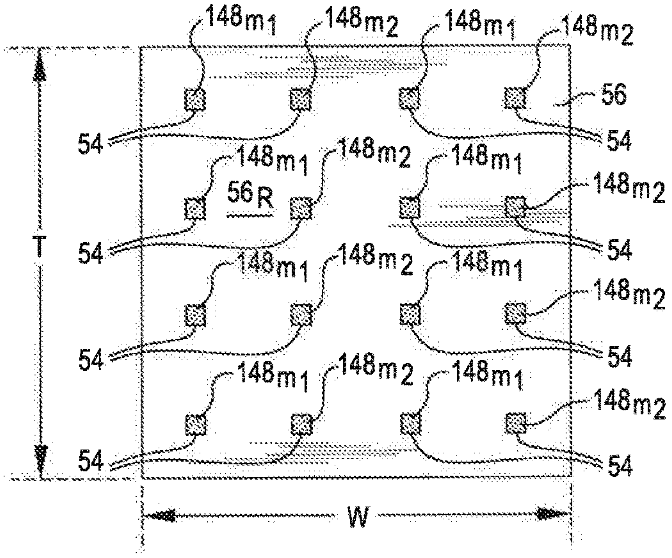

FIG. 6D shows a back elevation view of a wall panel 148 in a square configuration, for example as if provided in a thirty six inch by thirty six inch (36"×36") square, and using eight (8) pairs of magnets $148_{M1}$ and $148_{M2}$, $146_{M2}$ (or equivalent pairs of magnet packages as described below with respect to permanent magnet packages 210) spaced for secure magnetic engagement with two mounting brackets 22, one above the other on a wall (see FIG. 7). In an embodiment, each magnet in the eight pairs of magnets $148_{M1}$ and $148_{M2}$ may be provided at through-hole cutouts defined by edges 54 in a rear cover sheet 56, with the magnets being flush with the rear surface $56_R$ of the rear cover sheet 56.

As seen in FIG. 7, an exemplary wall panel system includes a plurality of mounting brackets 22 mounted on wall 24. The mounting brackets 22 (e.g. steel strips) are installed at selected spaced heights $H_1$, $H_2$, $H_3$, above the bottom elevation $H_0$ of a workpiece wall 24. The heights are shown as $H_1$, $H_2$, $H_3$, etc., to $H_N$, wherein N in a series of 1 to N is a positive integer, with height $H_N$ being the height of the highest mounting bracket 22 on a workpiece wall 24. As shown in FIG. 7, the highest mounting bracket 22 is located at height $H_8$ above the bottom elevation $H_0$ of wall 24. Also shown in FIG. 7 are planned locations 150 (shown as hidden line "O"s) for receiving permanent magnets (circular type magnet receiving locations are shown—see FIG. 10A, but similar locations are applicable for rectangular magnets as shown in FIGS. 6A-6D) that are located on the wall panels being installed. The mounting brackets 22 are provided with a composition including a magnetic body, (e.g. a ferromagnetic body, or ferrimagnetic body) adapted for securement to the workpiece wall 24. Also shown in broken lines in FIG. 7 are locations of wall panels as placed over mounting brackets 22 and magnetically secured thereto. For easy reference as to wall panel size, wall panels 140 (see FIG. 6A), 142 (see FIG. 6B), 146 (see FIG. 6C), and 148 (see FIG. 6D), are shown as if installed on wall 24 depicted in FIG. 7. In any event, the wall panels of various types as disclosed herein are each magnetically releasably securable to one or more of the mounting brackets 22. Moreover, as can be appreciated by the diagram in FIG. 7, wall panels (e.g. wall panels 140, or 142, or 148) are removable and at least some of such wall panels are interchangeable based on size and shape.

As shown in FIG. 7, and also in FIG. 1, in an embodiment at least one mounting bracket 22 having a magnetically attractable body may be provided in the form of an elongated steel strip. In most embodiments, at least two (2) mounting brackets 22 will be provided. The mounting brackets 22 are sized and shaped for securement to a workpiece wall 24. In an embodiment, the mounting brackets 22 may be provided as steel plates having a thickness of between eighteen gauge (0.05 inches) to twenty four gauge (0.025 inches), inclusive, subject to variance within customary commercial manufacturing tolerances. In an embodiment, the mounting brackets may be provided in carbon steel. In other embodiments, the mounting brackets may comprise steel brackets having a thickness of between eighteen gauge (0.05 inches) and twenty two gauge (0.03125 inches), inclusive, subject to variance within customary commercial manufacturing tolerances. In an embodiment, the mounting brackets 22 may be provided in galvanized steel.

Figure 8:
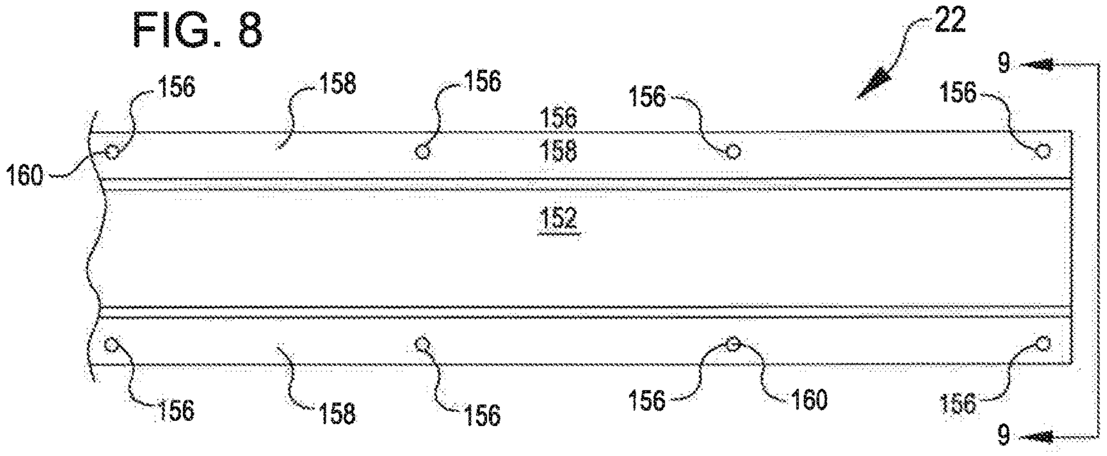
FIG. 8 shows a side view of an embodiment for an elongated mounting bracket in the form of a steel plate, sized and shaped for mounting to a workpiece wall, and to which wall panels having permanent magnets therein may be affixed.
Figure 9:
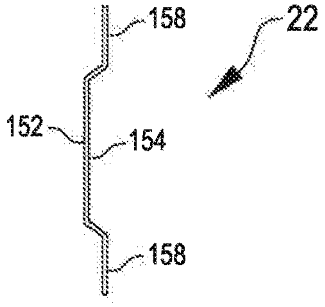
FIG. 9 is an end view, taken as if along line 9-9 of FIG. 8, showing a configuration for an embodiment of an elongated steel plate to be mounted on a wall for holding wall panels in place.

As seen in FIGS. 8 and 9, as well as in FIG. 7, each of the mounting brackets 22 include an attachment surface 152 facing outward from the workpiece wall 24 (see FIG. 7). In an embodiment, as shown in FIG. 9, the mounting bracket 22 may be in a trough shaped configuration, with the attachment surface 152 located an outwardly protruding portion 154 of the mounting bracket 22. As shown in FIG. 8, the mounting bracket 22 may have flanges 158 with mounting holes 160 therein defined by apertures 156 for use with fasteners 162 (see FIG. 7) such as screws for securing the mounting brackets 22 to wall 24.

Figure 10A:
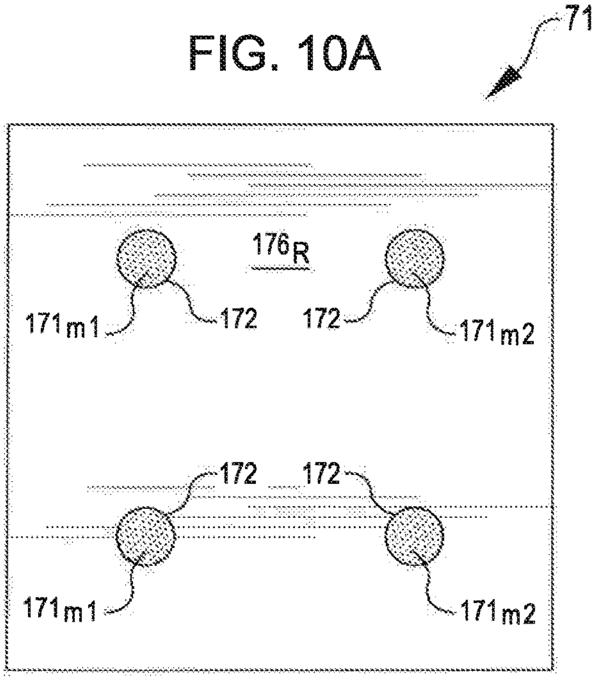
FIG. 10A shows a back elevation view of an embodiment for a wall panel, similar to FIG. 6A above, and provides an embodiment wherein four permanent magnets (two pairs of magnets) are mounted, using a circular magnet configuration, are mounted in a wall panel.
Figure 10B:
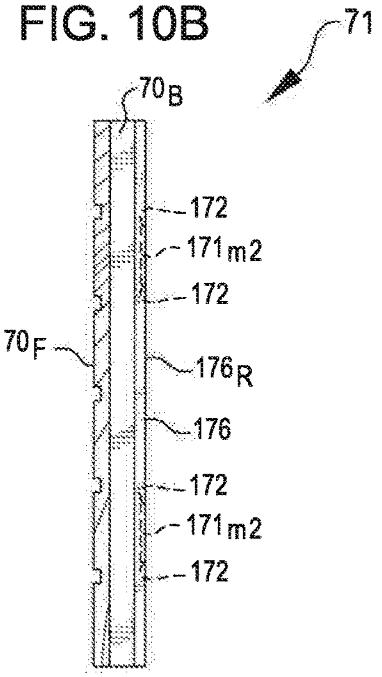
FIG. 10B shows a top view taken looking down on the wall panel just illustrated in FIG. 10A, and provides an embodiment wherein a single piece of wood, having grooves therein, is provided as a front panel, and also shows that permanent magnets may be provided at through-hole locations in a rear cover sheet and mounted to the reverse side of a backing plate.

In FIGS. 10A and 10B, an embodiment for a wall panel 71 is shown, having a wood veneer type face, similar to wall panel 70 illustrated in FIG. 5C above, but now shown using cylindrical permanent magnets 171, rather than parallelepiped shaped permanent magnets $\mathbf{70}_{M1}$ and $\mathbf{70}_{M2}$ (or equivalent magnet packages as described below with respect to permanent magnet packages 210), as suggested for wall panel 70 in FIGS. 4 and 5C. In an embodiment, the two pairs of magnets $\mathbf{171}_{M1}$ and $\mathbf{171}_{M2}$ may be provided at through-hole cutouts defined by edges 172 in a rear cover sheet 176, with the magnets being flush with the rear surface $\mathbf{176}_R$ of the rear cover sheet 176.

Figure 11A:
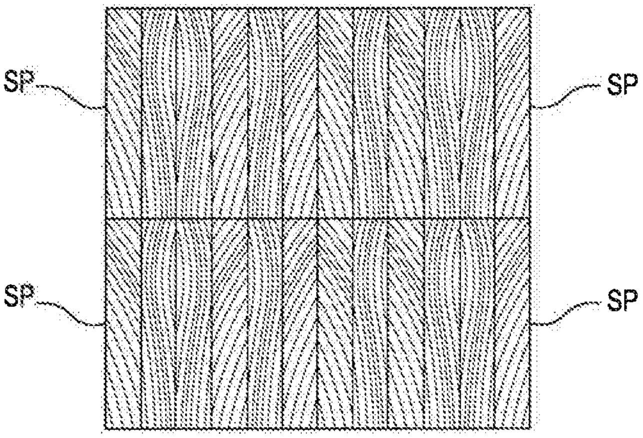
FIGS. 11A through 11D provide a front, vertical elevation view of wall panels of various sizes, showing how sets of eighteen inch by eighteen inch (18"×18") architectural panels (e.g. see FIG. 11B) may be assembled into easier to handle and quicker to install larger sized wall panels; in such cases a backing plate and rear cover sheet corresponding to the overall size of the wall panel may be used to provide the necessary stiffness, strength, and durability.
Figure 11B:
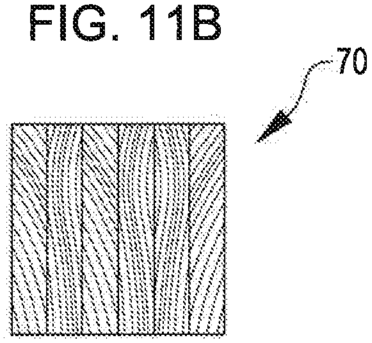
Figure 11C:
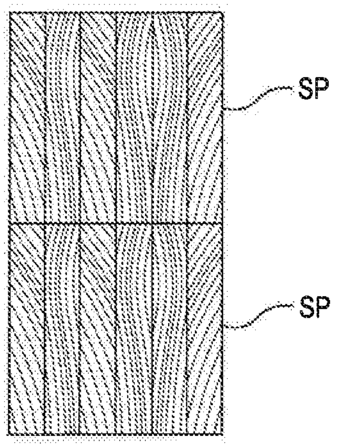
Figure 11D:
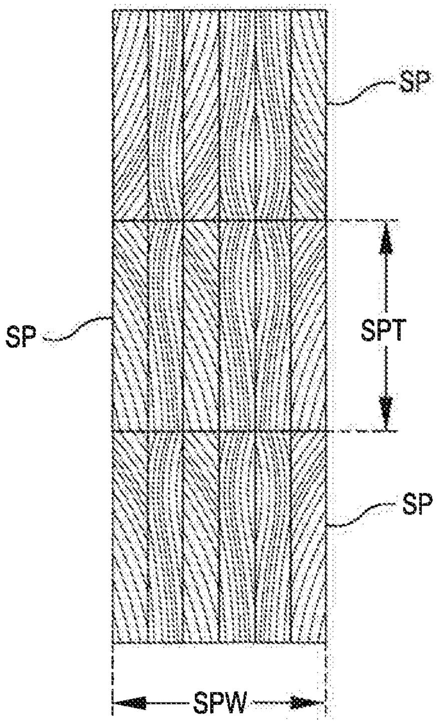

As may be further appreciated by a view of FIGS. 11A,11B, 11C, and 11D, in various embodiments for a wall panel, a backing plate (e.g. backing plate $\mathbf{70}_B$ shown in FIG. 5C) may be provided as a one-piece backing plate, but wherein the wood panels (shown with visible wood grain), are provided in multiple sub-panels SP having a sub-panel width SPW (e.g., eighteen inches (18")), and a sub-panel height SPT (e.g., eighteen inches (18")), but wherein each of the multiple sub-panels SP are mounted on the one-piece backing plate $\mathbf{70}_B$ of extended height (see FIGS. 11C and 11D), or of extended width, or both as shown in FIG. 11A.

Figure 12:
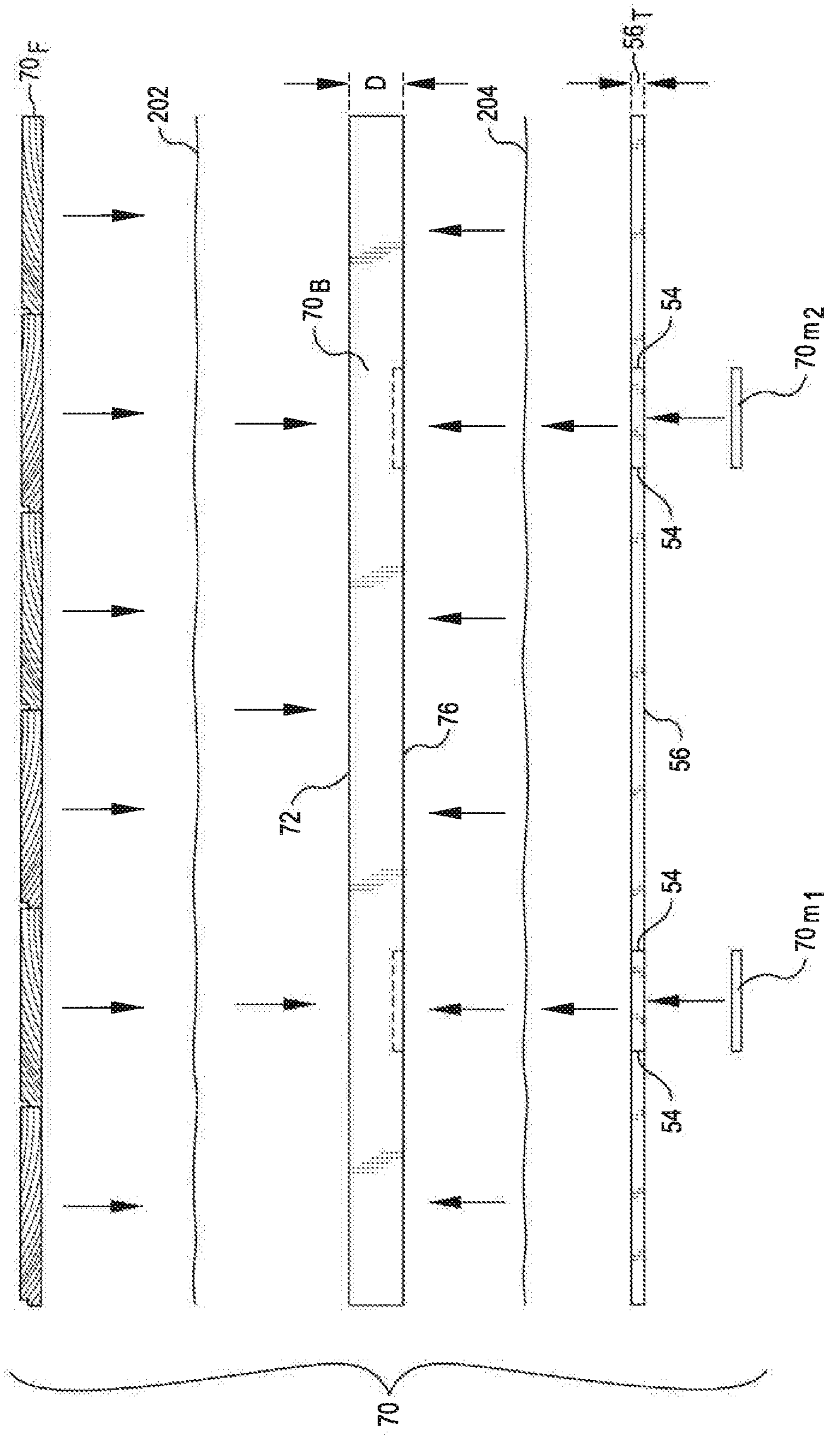
FIG. 12 is an exploded assembly diagram, illustrating how the various components of an embodiment for a wall panel are assembled, showing adhesive used to bond a front panel to the obverse side of a backing plate, and adhesive used to bond a rear cover sheet to the reverse side of a backing plate, as well as showing magnets located at cutouts in the rear cover sheet for bonding to the reverse side of the backing plate.

Attention is now directed to FIG. 12, where details of construction of an embodiment of a wall panel 70 is illustrated. The wall panel 70 is useful for providing wall panels in a wall panel system 200 as illustrated above, for example, in FIG. 7, in combination with FIGS. 1 and 2B, and accompanying description. A wall panel 70 includes a backing plate $\mathbf{70}_B$, which has an obverse side 72 and a reverse side 76. The thickness D of a backing plate $\mathbf{70}_B$ may be varied to suit various designs and service for a wall panel system 200. However, thickness D of at least ⅛ inch (⅛"), and up to as much as about ⅝ inch (⅝"), may be useful in various applications. In an embodiment, thickness D of the backing plate may be about zero point four four inches (0.44", or 11.1 mm). In any event, a front panel $\mathbf{70}_F$ is affixed to the obverse side 72 of the backing plate $\mathbf{70}_B$ using a suitable adhesive 202 for the service, such as a polyvinyl acetate ("PVA") type glue. A rear cover sheet 56 is provided, and the rear cover sheet is affixed to the reverse side 76 of the backing plate $\mathbf{70}_B$, using a suitable adhesive 204 for the service, such as a polyvinyl acetate ("PVA") type glue. Adhesive 202 and adhesive 204 may be the same, or may be different, and thus a suitable adhesive is selected based on materials used, in particular, for the front panel $\mathbf{70}_F$ material. And, adhesive 202 and adhesive 204 may be applied directly to the backing plate $\mathbf{70}_B$. A plurality of magnets, $\mathbf{70}_{M1}$ and $\mathbf{70}_{M2}$, are provided. The magnets $\mathbf{70}_{M1}$ and $\mathbf{70}_{M2}$ are recessed at least partially into, or mounted entirely through, the rear cover sheet 56 at through-hole cutouts defined by edges 54, and thus the magnets $\mathbf{70}_{M1}$ and $\mathbf{70}_{M2}$ are situated at locations configured for secure magnetic engagement with one or more mounting brackets 22, or in an embodiment with two or more of the mounting brackets 22. The finished wall panel 70 is suitable for use in wall system 200, and in service, is releasably securable to the attachment surface 152 of the mounting brackets 22 when the mounting brackets 22 are secured to a workpiece wall 24. In an embodiment, the rear cover sheet 56 may be provided using a resin impregnated paperboard or paper product. A suitable product for rear cover sheet 56 is PolyBak™ brand polymer impregnated Kraft liner board, which has a high moisture resistance, strength and flexibility for handing during manufacture. PolyBak™ brand polymer impregnated Kraft liner board may be obtained from Richwood Industries, Inc., 2700 Buchanan S. W., Grand Rapids, Michigan 49548, with details as found at the following URL: https://www.richwoodind.com/polybak. In an embodiment, the rear cover sheet 56 may be provided as a thin sheet of thickness $\mathbf{56}_T$ which in an embodiment may be as thin as about two hundred forty thousandths of an inch (0.024" or about 0.61 mm). In other embodiments, a wall panel 70 may utilize a plastic laminate, such as Formica® brand plastic laminate, as the rear cover sheet. Formica® is a registered trademark of The Diller Corporation of Cincinnati, Ohio.

Figure 13:
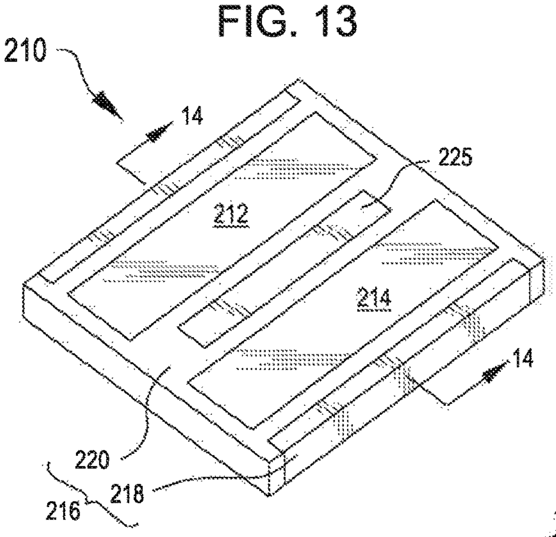
FIGS. 13 through 18 provide various details for embodiments of permanent magnets, wherein a pair of parallelepiped shaped magnets are provided set in a magnet holder corresponding to the overall size of magnets useful for particular wall panel sizes and weights, in order to provide the necessary magnetic strength in a compact, easy to mount magnet holder.
Figure 14:
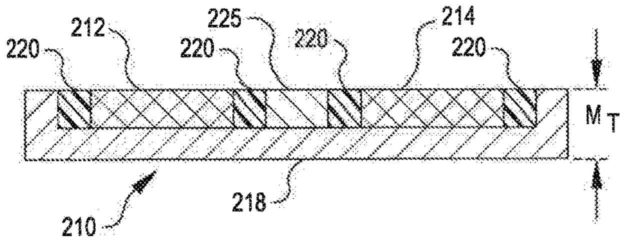
Figure 15:
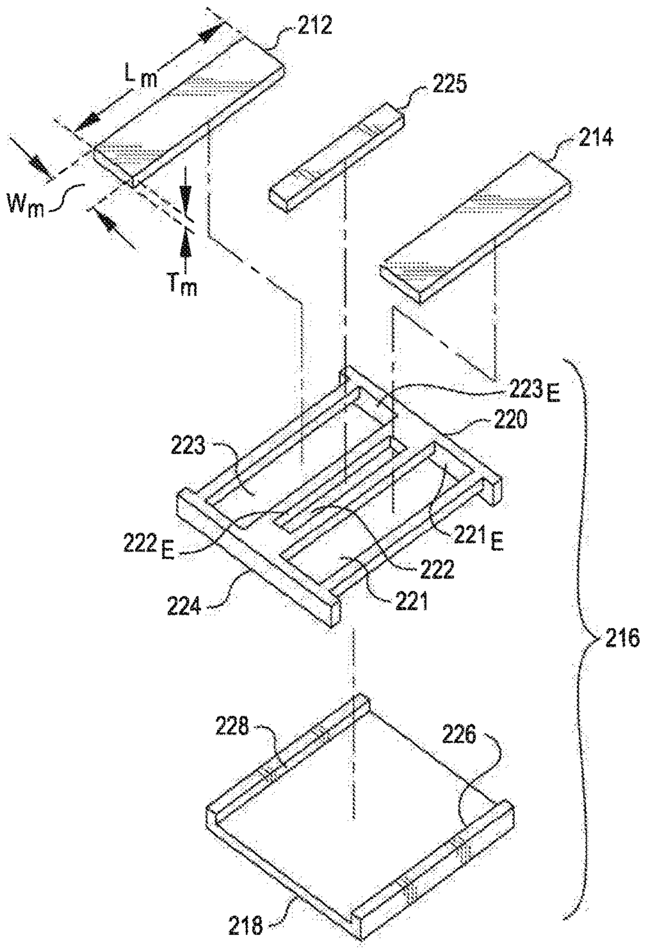

Attention is directed to FIGS. 13-18, where details of suitable embodiments for construction of permanent magnet packages are provided. FIG. 13 shows a fully assembled permanent magnet package 210, as suitable for use as the rectangular magnet packages illustrated in FIGS. 6A, 6B, 6C, and 6D (see above description and figures for details). A pair of permanent magnets 212 and 214 are shown installed in a two component magnet casing 216, which has a base metal casing 218, and a plastic frame casing 220 inserted into the base metal casing 218, as better seen in FIGS. 14 and 15. The plastic frame casing 220 is basically of an H multi-column type shape which forms two rectangular perimeters defining slots, 221 (defined by edgewall $221_E$) and slot 223 (defined by edgewall $223_E$), which securely cage permanent magnets 212 and 214. A slot 222 defined by edgewalls $222_E$ in the middle 224 of the plastic frame casing 220 provides a similar structure for securely caging a metal spacer 225 between the magnets 212 and 214. The plastic frame casing 220 fits securely into base metal casing 218 with close mating engagement with, and interfitting engagement between, peripheral flanges 226 and 228. This structure is easily seen in the cross-section across FIG. 13 which is provided in FIG. 14. Thus, as shown in FIGS. 13, 14, and 15, a pair of magnets 212 and 214 are inserted into slots in the plastic frame casing 220, and a metal spacer bar 225 between the two magnets 212 and 214. As shown, the magnets 212 and 214 have a width Wm and a length $L_M$ that utilizes the entire space available within slots 221 and 223 in the plastic frame casing 220. In an embodiment, the magnets 212 and 214 may be provided having an $L_M$ of one inch (1"). In an embodiment, the magnets 212 and 214 may be provided having a width $L_M$ of one quarter inch (0.25"). In an embodiment, the magnets may be provided having a thickness $T_M$ of about zero point one seven five inches (0.175"). In any event, the magnet casings 216 are sized and shaped for securely receiving therein one or more permanent magnets, and the magnet casings 216 should be provided in a thickness $M_T$ sufficiently thin for recessed mounting at least partially into, or mounted entirely through, the rear cover sheet. In an embodiment, the magnet casings 216 may be provided in a thickness $M_T$ sufficiently thin for recessed mounting at least partially into an accompanying backing plate (e.g. backing plate $\mathbf{70}_B$).

Figure 16:
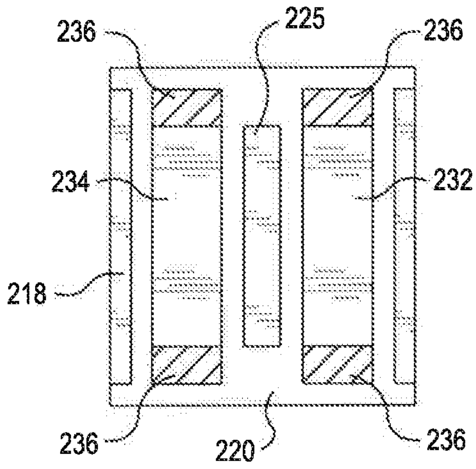

FIG. 16 provides a plan view of an embodiment for mounting a pair of permanent magnets in a magnet casing, similar to the embodiment just illustrated in FIGS. 13-15, but now showing use of shorter length magnets 232 and 234 (e.g. three quarter of an inch (¾") in length), and additionally showing the use of spacers 236 at either the of the magnets, but still showing the use of a base metal casing 218, a plastic frame casing 220 inserted in the base metal casing.

Figure 17:
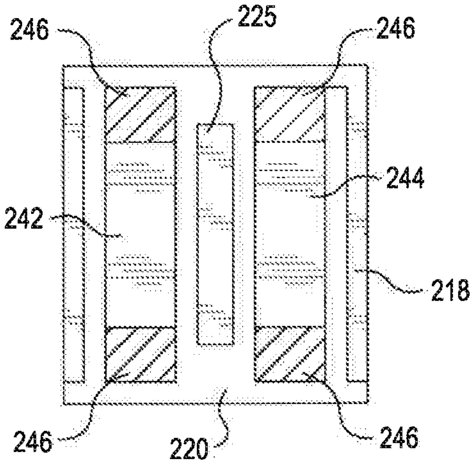

FIG. 17 provides a plan view of an embodiment for mounting a pair of permanent magnets in a magnet casing, similar to the embodiment just illustrated in FIG. 15, but now showing use of yet shorter length magnets 242 and 244 (e.g. five-eighths of an inch (⅝") in length), and additionally showing the use of spacers 246 at either the of the magnets, but still showing the use of a base metal casing 218 and a plastic frame casing 220 inserted in the base metal casing.

Figure 18:
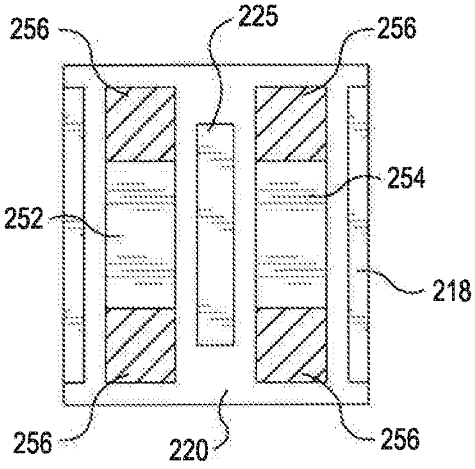

FIG. 18 provides a plan view of yet another embodiment for mounting a pair of permanent magnets in a magnet casing, similar to the embodiment just illustrated in FIGS. 16 and 17, but now showing use of yet shorter length magnets 252 and 254 (e.g. one-half of an inch (½") in length, and additionally showing the use of spacers 256 at either the of the magnets, but still showing the use of a base metal casing 218, and a plastic frame casing 220 inserted in the base metal casing.

In various embodiments, each one of the permanent magnet packages 210 (as set forth in FIG. 13, or FIG. 16, or FIG. 17, or FIG. 18, having two magnets or more magnets each) provides at least twenty (20) pounds of pull strength. In various embodiments, each one of the permanent magnet packages 210 (as set forth in FIG. 13, or FIG. 16, or FIG. 17, or FIG. 18, having two or more magnets each (e.g., magnets 212 and 214) provides at least twenty two (22) pounds of pull strength. In various embodiments, each one of the permanent magnet packages 210 (as set forth in FIG. 13, or FIG. 16, or FIG. 17, or FIG. 18, having two or more magnets each) provides at least twenty two pounds, or more, of pull strength. As noted above, in various embodiments, the permanent magnet packages 210 are provided in side by side pairs, and wherein at least two pairs of permanent magnet packages 210 are provided. In various embodiments, permanent magnets in the plurality of permanent magnets are provided in the form of neodymium magnets. In various embodiments, the permanent magnets may be provided in the form of neodymium grade N35 magnets. In various embodiments, the permanent magnets may be provided in the form of neodymium grade N40 magnets. In various embodiments, the permanent magnets may be provided in the form of neodymium grade N52 magnets.

In summary, the wall panel system described herein is a novel system for providing re-mountable interior cladding, or wall panels. The wall panel system makes available a variety of high quality, patterned, prefabricated architectural finishes, which are easy to install.

It is to be appreciated that the wall panel system with wall panels having recessed mounted permanent magnets, as provided in the easily mounted wall panels as disclosed herein, is an appreciable improvement in the art. The embodiments have been thoroughly described to enable those of ordinary skill in the art to make and use the invention, including embodiments which utilize various mounting brackets and architectural components, for reliable yet releasable mounting on walls.

Although only a few exemplary embodiments have been described in detail, various details are sufficiently set forth in the drawings and in the specification provided herein to enable one of ordinary skill in the art to make and use the invention(s), which need not be further described by additional writing in this detailed description. It will be readily apparent to those skilled in the art that the wall panels may be modified from those embodiments provided herein, without materially departing from the novel teachings and advantages provided.

The aspects and embodiments described and claimed herein may be modified from those shown without materially departing from the novel teachings and advantages provided by this invention, and may be embodied in other specific forms without departing from the spirit or essential characteristics thereof.

The embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

The invention claimed is:

1. A wall panel system, comprising:

(a) at least one mounting bracket, each of said at least one mounting bracket comprising a magnetically attractable body adapted for securement to a workpiece wall, each of the at least one mounting bracket further comprising an attachment surface facing outward from the workpiece wall;

(b) at least one reusable wall panel, the wall panel magnetically and releasably securable to at least one mounting bracket, the wall panel comprising (1) a backing plate ($60_B$), the backing plate having an obverse side and a reverse side and a thickness D therebetween, the backing plate further comprising recesses (63) therein defined between cutouts (64) into but not completely through thickness D of the backing plate, wherein each recess is sized and shaped for receiving a magnet casing therein for secure mounted engagement;

(2) a front panel, the front panel affixed to the obverse side of the backing plate, (3) a plurality of magnets;

(4) a plurality of magnet casings, wherein the magnet casings comprise steel and are sized and shaped for securely receiving and immobilizing therein two or more magnets in the plurality of magnets, and wherein the magnet casings are provided in a thickness $M_T$ and wherein each magnet casing is fully recessed into, and directly mounted and secured to and immobilized within the backing plate; and (c) wherein the wall panel is releasably securable to at least one mounting bracket; and (d) wherein the reusable wall panel further comprises a rear cover sheet, and wherein the rear cover sheet is affixed to the reverse side of the backing plate.

2. A wall panel system, comprising:

(a) a plurality of mounting brackets, the mounting brackets comprising horizontally disposed elongated magnetically attractable steel strips, the mounting brackets sized and shaped for securement to a workpiece wall, each of the mounting brackets comprising an attachment surface facing outward from the workpiece wall;

(b) a plurality of reusable wall panels, the wall panels magnetically and releasably securable to the mounting brackets, each of the wall panels comprising (1) a backing plate, the backing plate having an obverse side and a reverse side and a thickness D therebetween, the backing olate further comprising recesses (63) therein defined between cutouts (64) into but not completely through thickness D of the backing plate, wherein each recess is sized and shaped for receiving a magnet casing therein for secure mounted engagement;

(2) a front panel, the front panel affixed to the obverse side of the backing plate, (3) a rear cover sheet, the rear cover sheet affixed to the reverse side of the backing plate, (4) a plurality of magnets;

(5) a plurality of magnet casings, wherein the magnet casings comprise steel and sized and shaped for securely receiving and immobilizing therein one or more magnets in the plurality of magnets, and wherein the magnet casings are provided in a thickness $M_T$ for recessed mounting of magnet casings at least partially into the backing plate and wherein each magnet casing is recessed at least partially into, and directly mounted and secured to and immobilized as connected with the backing plate; and (c) wherein the plurality of magnet casings are situated at locations configured for magnetic contact with two or more of the plurality of mounting brackets, so that the reusable wall panel is releasably securable to an attachment surface of the mounting brackets.

3. A wall panel system as set forth in claim 1 or in claim 2, wherein the rear cover sheet comprises resin impregnated moisture resistant paperboard.

4. A wall panel system as set forth in claim 1 or in claim 2, wherein the front panel further comprises an exposed front surface, and wherein the exposed front surface comprises a solid wood surface.

5. A wall panel system as set forth in claim 1 or in claim 2, wherein the front panel further comprises an exposed front surface, and wherein the exposed front surface comprises a patterned wood panel.

6. A wall panel system as set forth in claim 1, wherein the magnet casing comprises a steel casing portion and a plastic frame casing portion.

7. A wall panel system as set forth in claim 1 or in claim 2, wherein the backing plate comprises one or more materials selected from the group consisting of (a) plywood, (b) particle board, (c) medium density fiber board, and (d) hard fiber board.

8. The wall panel system as set forth in claim 2, wherein the mounting brackets comprise galvanized steel.

9. The wall panel system as set forth in claim 2, wherein the mounting brackets have a thickness of between eighteen gauge (0.05 inches) and twenty four gauge (0.025 inches), inclusive.

10. The wall panel system as set forth in claim 2, wherein at least two or more of said wall panels are of interchangeable size and shape.

11. A reusable wall panel, the wall panel for use in a wall panel system including mounting brackets mounted on a workpiece wall, the mounting brackets comprising magnetically attractable strips having an attachment surface facing outward from the workpiece wall, the reusable wall panel comprising:

(a) a backing plate, the backing plate having an obverse side and a reverse side and a thickness D therebetween, the backing plate further comprising recesses therein defined between cutouts into but not completely through thickness D of the backing plate, wherein each recess is sized and shaped for receiving a magnet casing therein for secure mounted engagement;

(b) a front panel, the front panel affixed to the obverse side of the backing plate;

(c) a rear cover sheet, the rear cover sheet affixed to the reverse side of the backing plate;

(d) a plurality of permanent magnets;

(e) a plurality of magnet casings, wherein the magnet casings comprise steel and are sized and shaped for securely receiving and immobilizing therein one or more magnets in the plurality of permanent magnets, and wherein the magnet casings are provided in a thickness $M_T$ for recessed mounting of magnet casings, and where each magnet casing is at least partially recessed into the backing plate and directly mounted and secured to and immobilized by the backing plate, and wherein the magnet casing comprises a steel casing portion and a plastic frame casing portion; and (f) wherein the reusable wall panel is releasably securable to the attachment surface of the mounting brackets when the mounting brackets are secured to a workpiece wall.

12. A wall panel as set forth in claim 11, wherein the backing plate is provided in a nominal thickness of between one-eighth inch (⅛") and five eighths of an inch (⅝"), inclusive.

13. A wall panel as set forth in claim 11, wherein the rear cover sheet comprises a plastic laminate.

14. A wall panel as set forth in claim 11, wherein the front panel and the backing plate are affixed one to the other by an adhesive.

15. A wall panel as set forth in claim 11, further comprising an adhesive layer between the backing plate and the rear cover sheet, and wherein the backing plate and the rear cover sheet are affixed one to the other by the adhesive.

16. A wall panel as set forth in claim 11, further comprising an adhesive layer between the front panel and the backing plate, and wherein the front panel and the backing plate are affixed one to the other by the adhesive.

17. A wall panel as set forth in claim 11, wherein each of the permanent magnets are mounted in a magnet casing, and wherein at least one of said plurality of permanent magnets provides at least twenty pounds of pull strength.

18. A wall panel as set forth in claim 11, wherein each of the permanent magnets are mounted in a magnet casing, and wherein at least one of said plurality of permanent magnets provides twenty two or more pounds of pull strength.

19. A wall panel as set forth in claim 11, wherein the plurality of permanent magnets are provided in pairs, and wherein at least two pairs of permanent magnets are provided.

20. A wall panel as set forth in claim 11, where in the plurality of permanent magnets comprise neodymium magnets.

21. A wall panel as set forth in claim 20, wherein the plurality of magnets comprise neodymium grade N52 magnets.

22. A wall panel as set forth in claim 11, wherein the wall panel has a width W and height T, and is parallelepiped in shape.

23. A wall panel as set forth in claim 22, wherein the wall panels are provided in a set of X sizes in a series, wherein X is a positive integer, and wherein W and T for a panel X are selected from the following table:

| X | W (width) (inches) | T (height) (inches) |
|---|---|---|
| 1 | 18 | 18 |
| 2 | 18 | 36 |
| 3 | 18 | 54 |
| 4 | 36 | 36. |

24. A wall panel as set forth in claim 11, wherein the front panel further comprises an exposed front surface, and wherein the exposed front surface comprises one or more wood portions.

25. A wall panel as set forth in claim 24, wherein the wood portions comprise wood panels having visible wood grain structure.

26. A wall panel as set forth in claim 25, wherein the wood panels include grooves.

27. A wall panel as set forth in claim 11, wherein the front panel comprises a dry erase board face.

28. A wall panel as set forth in claim 11, wherein the front panel comprises a chalk board.

29. A wall panel as set forth in claim 11, wherein the front panel comprises a textile surface.

30. A wall panel as set forth in claim 29, wherein the textile surface comprises felt.

31. A wall panel as set forth in claim 11, wherein the front panel comprises a metal surface.

32. A wall panel as set forth in claim 11, wherein the front panel comprises a tempered glass surface.

33. A wall panel as set forth in claim 11, wherein the front panel comprises a textured glass surface.

34. A wall panel as set forth in claim 11, wherein the front panel comprises a painted surface.

35. A wall panel as set forth in claim 11, wherein the front panel comprises a metal surface.

36. A wall panel as set forth in claim 11, wherein the front panel further comprises a bookshelf.

37. A wall panel as set forth in claim 11, wherein the front panel further comprises a light panel, the light panel including one or more light sources operatively connected to electrical power, and a translucent outer surface panel.

38. A reusable wall panel as set forth in claim 11, wherein the plastic frame casing portion comprises an H shaped multi-column configuration which provides two rectangular perimeters each of which define magnet receiving slots.

39. A reusable wall panel as set forth in claim 38, wherein the plurality of magnets comprises a first magnet and a second magnet, and wherein the plastic frame casing portion further defines a rectangular spacer perimeter, the rectangular spacer perimeter sized and shaped for securely locating and caging therein a metal spacer at a location between the first magnet and the second magnet.

* * * * *